United States Patent
Sassin

(10) Patent No.: US 11,372,826 B2
(45) Date of Patent: Jun. 28, 2022

(54) DYNAMIC INCLUSION OF CUSTOM COLUMNS INTO A LOGICAL MODEL

(71) Applicant: ORACLE INTERNATIONAL CORPORATION, Redwood Shores, CA (US)

(72) Inventor: Michael Sassin, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 45 days.

(21) Appl. No.: 17/093,936

(22) Filed: Nov. 10, 2020

(65) Prior Publication Data

US 2022/0121632 A1 Apr. 21, 2022

Related U.S. Application Data

(60) Provisional application No. 63/093,344, filed on Oct. 19, 2020.

(51) Int. Cl.
| | |
|---|---|
| *G06F 16/00* | (2019.01) |
| *G06F 16/21* | (2019.01) |
| *G06Q 10/10* | (2012.01) |
| *G06F 16/22* | (2019.01) |
| *G06F 9/451* | (2018.01) |
| *G06F 16/26* | (2019.01) |
| *G06F 16/245* | (2019.01) |
| *G06F 3/0484* | (2022.01) |

(52) U.S. Cl.
CPC ............ *G06F 16/212* (2019.01); *G06F 9/451* (2018.02); *G06F 16/221* (2019.01); *G06F 16/2282* (2019.01); *G06F 16/245* (2019.01); *G06F 16/26* (2019.01); *G06Q 10/10* (2013.01); *G06F 3/0484* (2013.01)

(58) Field of Classification Search
CPC ..... G06F 16/217; G06F 16/213; G06F 16/211
See application file for complete search history.

(56) References Cited

U.S. PATENT DOCUMENTS

| | | | |
|---|---|---|---|
| 7,392,255 B1 | 6/2008 | Sholtis et al. | |
| 7,640,264 B1 | 12/2009 | Chaulk et al. | |
| 7,962,512 B1 | 6/2011 | Sholtis et al. | |
| 10,169,378 B2 | 1/2019 | Sassin | |
| 2008/0046677 A1* | 2/2008 | Maupin | G06F 12/0207 |
| | | | 711/E12.003 |
| 2016/0078064 A1 | 3/2016 | Sassin | |

(Continued)

*Primary Examiner* — Cheryl Lewis
(74) *Attorney, Agent, or Firm* — Kraguljac Law Group, LLC

(57) ABSTRACT

Systems, methods, and other embodiments associated with dynamic inclusion of custom columns into a logical model are described. In one embodiment, a method includes mapping a selected custom logical column in the logical model to a custom physical column represented as a row in a physical table in real time by assigning a column sequence identifier uniquely associated with the selected custom logical column to the custom physical column; retrieving a custom column definition for the custom physical column in real time to form an enriched dataset of custom column records; pivoting the enriched dataset into the selected custom logical column in real time to integrate the custom logical column into the logical model; and presenting the logical model including the mapped custom logical columns for access in a business intelligence environment.

20 Claims, 7 Drawing Sheets

(56) References Cited

U.S. PATENT DOCUMENTS

2018/0129691 A1\*  5/2018  Mathur ............... G06F 16/2272
2018/0165316 A1\*  6/2018  Chen ....................... G06F 16/23
2019/0318272 A1   10/2019  Sassin \* cited by examiner

FIG. 6

DYNAMIC INCLUSION OF CUSTOM COLUMNS INTO A LOGICAL MODEL

CROSS REFERENCE TO RELATED APPLICATIONS

This disclosure claims the benefit of U.S. Provisional Patent Application Ser. No. 63/093,344 filed Oct. 19, 2020, titled "Dynamic Inclusion of Custom Columns Into a Logical Model", inventor: Michael Sassin, and assigned to the present assignee, which is incorporated by reference herein in its entirety.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Logical business intelligence models in a business intelligence platform may be used to represent an underlying physical schema as a star schema for dimensional reporting. In some circumstances, users or customers may wish to include their own custom columns or custom values in the business intelligence logical model. The number of attributes desired to be defined by the customer is arbitrarily large. The customer desires to add custom columns into the logical model so that customers can use custom columns as attributes in the same manner as attributes by standard tables.

One solution is to define a fixed number of 'flex fields' into the data model (fact or dimension tables) and map these flex fields into the logical model (as defined in the BI platform repository or "RPD" files). This approach is unsatisfactory because it limits the number of supported custom fields to the fixed number of flex fields. This approach is also unsatisfactory because adding custom columns requires schema changes and changes to a repository file before the custom columns take effect. The approach is also unsatisfactory because it limits how columns can be mapped. For example, the sequence of columns often cannot be defined. Also, because data is part of a dimension table, it cannot be easily mapped, unmapped, or remapped. Further, custom columns created as flex fields cannot readily accept custom names or be readily hidden.

Accordingly, there exists a need for systems and methods for dynamic inclusion of custom columns into a logical model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 6 illustrates one embodiment of a graphical user interface (GUI) for enabling and mapping characteristics to custom columns associated with dynamic inclusion of custom columns into a logical model.

DETAILED DESCRIPTION

Figure 1:
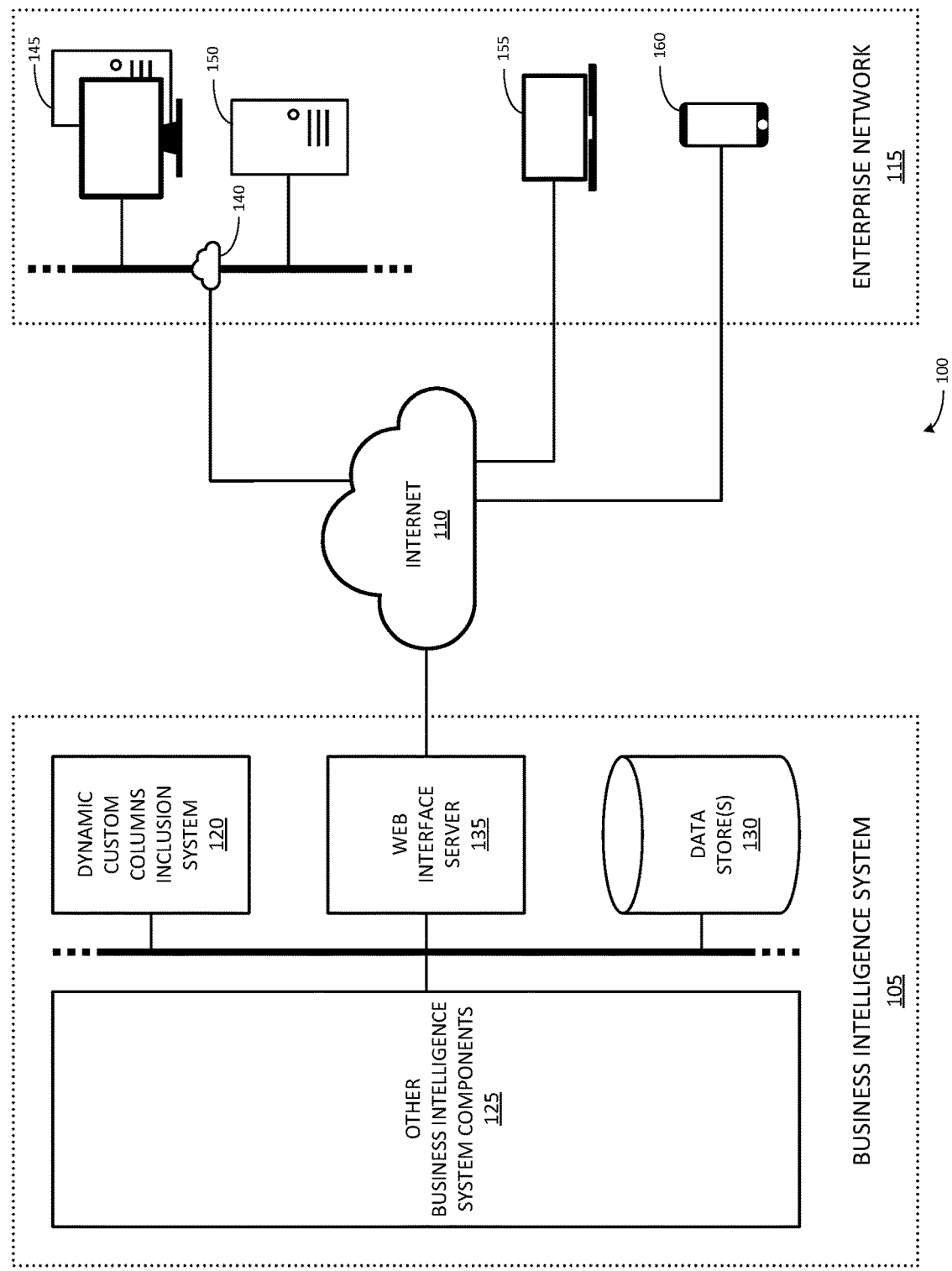
FIG. 1 illustrates one embodiment of a computing system associated with dynamic inclusion of custom columns into a logical model.

Systems and methods are described herein that provide dynamic inclusion of custom columns into a logical model. In one embodiment, cloud applications have a data model that may contain an arbitrary number of custom attributes (defined by the customer) or fields stored in a separate child table as name/type and value pairs. As described herein, a business intelligence (BI) platform such as Oracle® Business Intelligence Enterprise Edition (OBIEE), Oracle® Analytics Cloud (OAC) or Oracle® Application Server (OAS) may be extended to integrate the custom attributes and map them dynamically into one or more BI repository files (RPD file) which represents the logical model that is presented to the customer. The custom columns appear dynamically in the dimensions of the logical model, which may be presented in OBIEE, OAC and OAS Data Visualization (DV) graphical user interfaces (GUIs).

In one embodiment, custom columns may be represented as name-value pairs in child tables associated with main dimension tables of the logical model. This is a very flexible representation for custom columns. In one embodiment, systems and methods described herein provide a mechanism to define a flexible, dynamic mapping of custom fields to existing BI repository structures.

In one embodiment, the number of available custom fields for a dimension table has an upper limit set by system administrators. In practice, a limit of 100 custom fields per dimension table is generally more than sufficient to accommodate all the custom fields that may be desired by the customer, but the limit can be raised or lowered as needed or desired. For example, a DV tool such as Oracle® Utility Global Business Unit's (UGBU's) Analytic Visualization or Oracle® Data Visualization may be configured to integrate up to 100 custom columns per dimension by default, but this could be readily increased to 200 or more custom columns as needed. Or, the default number of columns can be readily decreased.

Advantageously, the entire infrastructure that maps custom column metadata into a logical BI repository model is generated. This simplifies the delivery and extension of the mapping capabilities. For example, using the systems and methods described herein, the UGBU's Analytic Visualization tool maps about 20,000 logical custom columns to the dynamic infrastructure (and many more custom columns in a presentation layer). In an implemented example system, (such as business intelligence system 105 shown and described below with reference to FIG. 1) this mapping generation runs in only about 20 seconds, although this amount of time for the mapping generation is dependent on the size of the model, and the time taken increases linearly with increase in model size. In one embodiment, this mapping generation is a step in a larger overall generation process that takes less than 2 minutes in the implemented example system.

In one embodiment, the systems and methods for dynamic inclusion of custom columns into a logical model maps custom columns defined in a table with name-value pairs to the logical model. This design supports a high number of attributes per dimension table, such as 100 attributes. As discussed above, the upper limit can be defined when the BI repository file is created and can be easily extended by configuration changes.

In one embodiment, the mapping of custom columns can be done dynamically by customers without modifying the BI repository file. After dynamic mapping of the custom columns, the mapped columns will be visible to the customer after DV canvases are refreshed. In one embodiment, the sequence in which custom columns appear can be defined by the customer. In one embodiment, the customer may assign a customer-defined name to each custom column. In one embodiment, only actively mapped custom columns are shown in the DV model. All unmapped columns do not appear in the DV model.

Once the infrastructure of custom columns represented as name-value pairs in child tables is established, no schema changes in the physical data model are required to map, unmap, or remap custom fields. Clutter in the DV model is eliminated by not showing unmapped BI repository columns and usability is maximized by allowing the customer to use meaningful, customer-defined names for custom columns rather than generic names such as UDA001, . . . , UDA100 columns.

The systems and methods described herein provide automatic, dynamic inclusion of custom columns into a logical model in minutes or seconds, where it was not previously possible for computing systems to automatically or dynamically include custom columns into a logical model at all, and where adding custom columns to a logical model otherwise requires several person-months of potentially error-prone manual extension of the BI repository file.

In one embodiment, the automatic, dynamic inclusion of custom columns into a logical model:
1) defines a large number of placeholders for custom fields on all eligible dimension tables (and/or, in one embodiment, all eligible fact tables) as required by RPD;
2) defines a SQL-based mapping layer between logical model columns and physical table with the custom columns;
3) uses metadata describing the custom data to dynamically assign each custom column in the logical model a user-defined name; and
4) uses metadata describing the custom data to hide unmapped custom column slots to avoid unused custom column fields (potentially thousands of fields) appearing in the logical model.

While example systems and methods are described herein with reference to improving Oracle® business intelligence tools such as those based on OBIEE or OAC and that utilizes BI repository files, the solution approach may be generalized to other BI solutions and Data Warehouse solutions. In particular, the approach described herein may be used for dimensional reporting even if OBIEE and OAC are not used. For example, other BI tools such as Microstrategy's business intelligence applications or IBM's Cognos analytics applications may be improved in a similar manner by the systems and methods for dynamic inclusion of custom columns into a logical model described herein. Further, while example systems and methods are described herein with reference to visualizing data using Oracle® data visualization tools, the systems and methods described herein may also use other data visualization tools such as Tableau and other reporting tools.

No action or function described or claimed herein is performed by the human mind. An interpretation that any action or function can be performed in the human mind is inconsistent with and contrary to this disclosure. Further, the techniques described herein were not previously performed manually.

—Example Business Intelligence Environment—

FIG. 1 illustrates one embodiment of a computing system 100 associated with dynamic inclusion of custom columns into a logical model. In one embodiment, system 100 includes a business intelligence system 105 connected by the Internet 110 (or another suitable communications network or combination of networks) to an enterprise network 115. In one embodiment, business intelligence system 105 may be an OBIEE or OAC service implementation. In one embodiment, business intelligence system 105 includes various systems and components such as dynamic custom columns inclusion system 120, other business intelligence system components 125, data store(s) 130, and web interface server 135.

In one embodiment, dynamic custom columns inclusion system 120 includes one or more components configured for implementing methods (such as method 200), functions, and features described herein associated with dynamic inclusion of custom columns into a logical model.

In one embodiment, other business intelligence system components 125 may include business intelligence applications and functions for retrieving, analyzing, mining, visualizing, transforming, reporting, and otherwise making use of data associated with operation of a business. In one embodiment, other business intelligence system components 125 may include data gathering components that capture and record the data associated with operation of the business in a data repository such as data store(s) 130. In one embodiment, other business intelligence system components 125 may further include user administration modules for governing the access of users to business intelligence system 105.

Each of the components of business intelligence system 105 is configured by logic to execute the functions that the component is described as performing. In one embodiment, the components of business intelligence system may each be implemented as sets of one or more software modules executed by one or more computing devices specially configured for such execution. In one embodiment, the components of business intelligence system 105 are implemented on one or more hardware computing devices. In one embodiment, the components of business intelligence system 105 are each implemented by dedicated computing devices. In one embodiment, the components of business intelligence system 105 are implemented by a common (or shared) computing device, even though represented as discrete units in FIG. 1. In one embodiment, business intelligence system 105 may be hosted by a dedicated third party, for example in an infrastructure-as-a-service (IAAS), platform-as-a-service (PAAS), or software-as-a-service (SAAS) architecture. In one embodiment, the components of business intelligence system 105 intercommunicate by electronic messages or signals. These electronic messages or signals may be configured as calls to functions or procedures that access the features or data of the component, such as for example application programming interface (API) calls. Each component of business intelligence system 105 may parse the content of an electronic message or signal received to identify commands or requests that the component can perform, and in response to identifying the command, the component will automatically perform the command or request.

Enterprise network 115 may be associated with a business. For simplicity and clarity of explanation, enterprise network 115 is represented by an on-site local area network 140 to which one or more personal computers 145, or servers 150 are operably connected, along with one or more remote user computers 155 or mobile devices 160 that are connected to the enterprise network 115 through the Internet 110. Each personal computer 145, remote user computer 155, or mobile device 160 is generally dedicated to a particular end user, such as an employee or contractor associated with the business, although such dedication is not required. The personal computers 145 and remote user computers 155 can be, for example, a desktop computer, laptop computer, tablet computer, or other device having the ability to connect to local area network 140 or Internet 110. Mobile device 160 can be, for example, a smartphone, tablet computer, mobile phone, or other device having the ability to connects to local area network 140 or Internet 110 through wireless networks, such as cellular telephone networks or Wi-Fi. Users of the enterprise network 115 interface with business intelligence system 105 across the Internet 110 (or another suitable communications network or combination of networks).

In one embodiment, remote computing systems (such as those of enterprise network 115) may access information or applications provided by business intelligence system 105 through web interface server 135. In one embodiment, the remote computing system may send requests to and receive responses from web interface server 135. In one example, access to the information or applications may be effected through use of a web browser on a personal computer 145, remote user computers 155 or mobile device 160. For example, these computing devices 145, 155, 160 of the enterprise network 115 may request and receive a web-page-based graphical user interface (GUI) for dynamically configuring (for example, setting up or removing) custom columns for use in business intelligence system 105. In one example, web interface server 135 may present HTML code to personal computer 145, server 150, remote user computers 155 or mobile device 160 for these computing devices to render into the GUI for business intelligence system 105. In another example, communications may be exchanged between web interface server 135 and personal computer 145, server 150, remote user computers 155 or mobile device 160, and may take the form of remote representational state transfer (REST) requests using JavaScript object notation (JSON) as the data interchange format for example, or simple object access protocol (SOAP) requests to and from XML servers. For example, computers 145, 150, 155 of the enterprise network 110 may request information included in the custom columns, or may request information derived at least in part from information included in the custom columns (such as analytics results based at least in part on the custom columns).

In one embodiment, data store 160 includes one or more operational databases configured to store and serve a broad range of information relevant to the operation of a business, such as data about enterprise resource planning, customer relationship management, finance and accounting, order processing, time and billing, inventory management and distribution, employee management and payroll, calendaring and collaboration, product information management, demand & material requirements planning, purchasing, sales, sales force automation, marketing, ecommerce, vendor management, supply chain management, product lifecycle management, descriptions of hardware assets and their statuses, production output, shipping and tracking information, and any other information collected by the business. Such operational information may be stored in the operational database in real-time at the time the information is collected. In one embodiment, the data store 160 includes a mirror or copy database for each operational database which may be used for disaster recovery, or secondarily to support read-only operations. In one embodiment, the operational database is an Oracle® database. In some example configurations, data store(s) 160 may be implemented using one or more Oracle® Exadata compute shapes, network-attached storage (NAS) devices and/or other dedicated server device.

—Example Method for Dynamic Custom Column Inclusion—

In one embodiment, each step of computer-implemented methods described herein may be performed by a processor (such as processor 810 as shown and described with reference to FIG. 8) of one or more computing devices (i) accessing memory (such as memory 815 and/or other computing device components shown and described with reference to FIG. 8) and (ii) configured with logic to cause the system to execute the step of the method (such as dynamic custom columns inclusion logic 830 shown and described with reference to FIG. 8). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 815, or storage/disks 835 of computing device 805 or remote computers 865 shown and described with reference to FIG. 8).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 2:
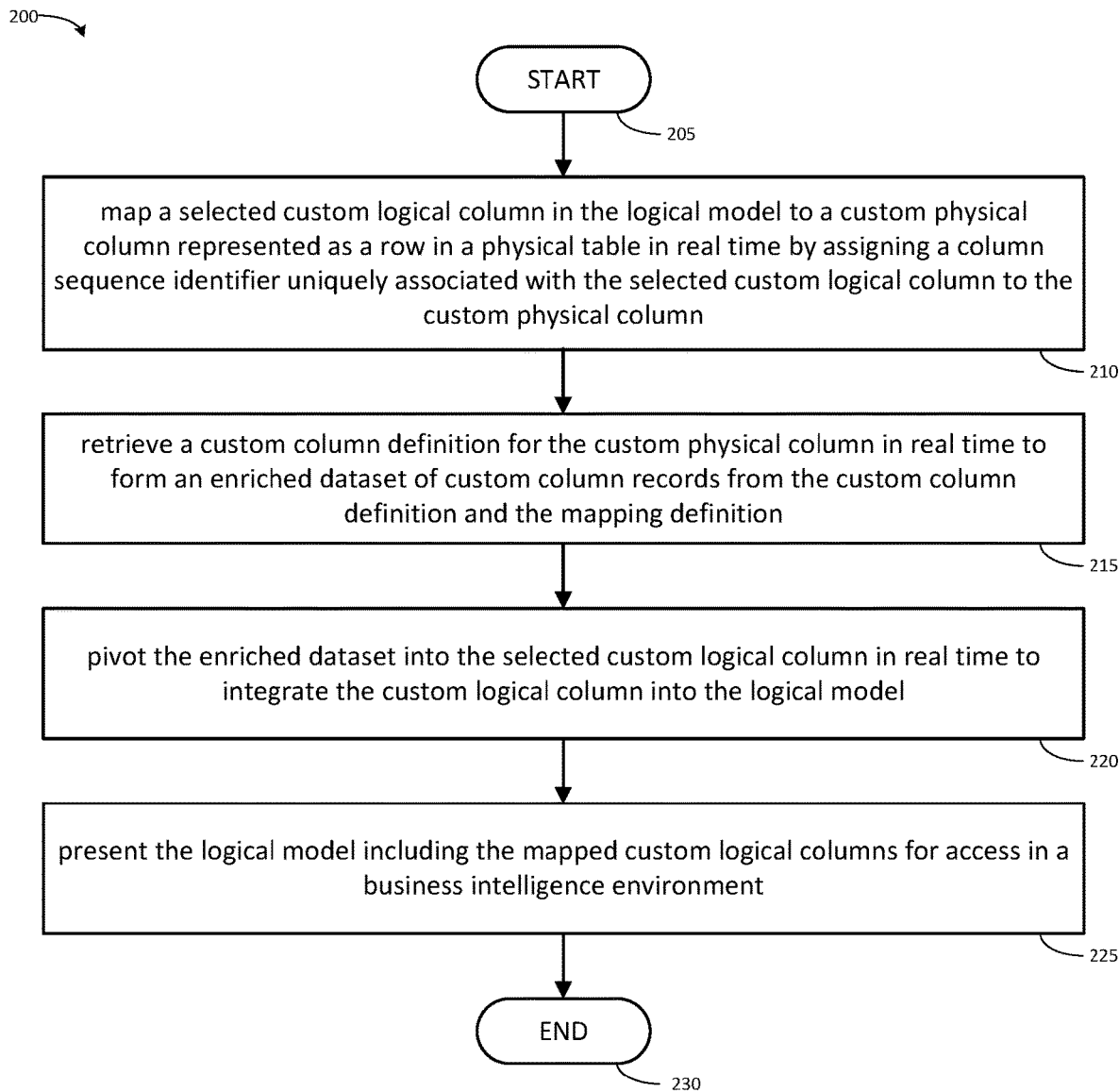
FIG. 2 illustrates one embodiment of a method associated with dynamic inclusion of custom columns into a logical model.

FIG. 2 illustrates one embodiment of a method 200 associated with dynamic inclusion of custom columns into a logical model. In one embodiment, the steps of method 200 are performed by dynamic custom columns inclusion system 120 (as shown and described with reference to FIGS. 1 and 7, and elsewhere herein). In one embodiment, dynamic custom columns inclusion system 120 is a special purpose computing device (such as computing device 805) configured with dynamic custom columns inclusion logic 830. In one embodiment, dynamic custom columns inclusion system 120 is a module of a special purpose computing device configured with logic 830.

The method 200 may be initiated automatically based on various triggers, such as in response to receiving a signal over a network or parsing stored data indicating that (i) a user (or administrator) of dynamic custom columns inclusion system 120 has initiated method 200, (ii) method 200 is scheduled to be initiated at defined times or time intervals, or (iii) a user (or administrator) of dynamic custom columns inclusion system 120 has provided an input indicating selection of an available custom logical column for mapping to a custom physical column, for example through a GUI. The method 200 initiates at START block 205 in response to parsing a signal received or stored data retrieved and determining that the signal or stored data indicates that the method 200 should begin. Processing continues to process block 210.

At process block 210, the processor maps a selected custom logical column in the logical model to a custom physical column represented as a row in a physical table in real time by assigning a column sequence identifier uniquely associated with the selected custom logical column to the custom physical column.

In one embodiment, a logical model is one expression of a dimensional model used for business intelligence. In one embodiment, the custom physical column is represented as a row of a table in the physical layer. In one embodiment, the row is a row in a custom table (also referred to as a characteristics table). In one embodiment, the row is a potential value for a custom column mapped to an available logical column.

In one embodiment, the processor receives a selection of a custom physical column and a selection of a custom logical column to which the custom physical column is to be mapped. In one embodiment, these selections may be received from a user through an interface such as a graphical user interface. In one embodiment, the selections may be made automatically by a computing device configured to assign custom columns according to an algorithm such as "most used custom column" or "alphabetical order." In one embodiment, the processor parses the selections to determine which custom physical column has been chosen, and to determine which column sequence identifier has been selected. The processor identifies the custom logical column associated with the column sequence identifier. The processor automatically generates a mapping that describes the row that represents the custom physical column and that indicates the column sequence identifier.

In one embodiment, the mapping definition includes two parts: first, a mapping of the column sequence identifier and a value related to a custom column, and then second, a mapping of the column sequence identifier and value to a physical column.

In one embodiment, the processor may store the mapping. For example, the processor may further store the assignment of the column sequence identifier to the custom physical column that describes the mapping in a configuration table of mappings for the logical model. The configuration table may be part of the logical model, and may be maintained as a data structure in data store 130. In one embodiment, the processor writes the values of the mapping—the column sequence identifier, and value indicating the custom column (such as a user-defined attribute number) and a physical column identifier—as a data structure that indicates that they are related as a mapping.

In one embodiment, the steps of process block 210 are performed by mapping, definition, and pivot query module 715 of dynamic column inclusion module 710 as shown and described with reference to FIG. 7. These actions are automatically performed in real-time—in immediate or prompt response to input information—by the processor.

Once the processor has thus completed mapping a selected custom logical column in the logical model to a custom physical column represented as a row in a physical table in real time, processing at process block 210 completes, and processing continues to process block 215.

At process block 215, the processor retrieves a custom column definition for the custom physical column in real time to form an enriched dataset of custom column records from the custom column definition and the assigned column sequence identifier.

In one embodiment, the processor retrieves metadata describing the custom physical column from the custom metadata table. The processor joins—for example with a left outside join—the retrieved metadata (on the left of the join) and the values of the custom physical column (on the right of the join). The join operation produces a dataset of column values from the physical table that is enriched by the retrieved metadata describing the custom physical column. In one embodiment, the processor stores the enriched dataset in memory or storage pending dynamic inclusion of the enriched dataset in a placeholder column of the logical model. In one embodiment, the enriched dataset is represented as a row in storage.

In one embodiment, the steps of process block 215 are performed by mapping, definition, and pivot query module 715 of dynamic column inclusion module 710 as shown and described with reference to FIG. 7. These actions are automatically performed in real-time by the processor in response to the completion of process block 210.

Once the processor has thus completed retrieving a custom column definition for the custom physical column in real time to form an enriched dataset of custom column records from the custom column definition and the assigned column sequence identifier, processing at process block 215 completes, and processing continues to process block 220.

At process block 220, the processor pivots the enriched dataset into the selected custom logical column in real time to integrate the custom logical column into the logical model.

In one embodiment, in response to the completion of the enriched dataset (or the last of multiple enriched datasets for multiple custom columns) the processor automatically evaluates each possible custom logical column to determine if that column is intended to receive the pivoted enriched dataset. In one embodiment, the processor compares a sequence identifier associated with the custom logical column against a sequence identifier assigned to custom physical column underlying the enriched dataset during the mapping at process block 210. When the processor finds a match between these values, the processor has identified the selected custom logical column. In response to the identification of the selected custom logical column, the processor automatically pivots the enriched dataset from a row to a column form and inserts the output column form into the selected custom logical column. Thus, the processor automatically turns the unique values in the row-shaped enriched dataset into multiple logical columns in the selected custom logical table. The processor saves the logic that generates the custom logical column in the BI repository file to maintain the custom logical column. The custom logical column can now be interacted with as if it is an ordinary (that is, not dynamically generated) column in the logical model. The custom logical column is therefore successfully integrated into the logical model.

Note that in one embodiment, multiple discretely mapped and enriched data sets (generated by repeated operation of process blocks 210 and 215 for unique custom physical columns and unique column sequence identifiers) may be integrated into the logical model in a single execution of process block 220. So, for example, a user may provide an input that maps several custom physical columns respectively to several available custom logical columns. In response to that input with multiple mappings, the processor will automatically re-execute process blocks 210 and 215 for each of the multiple mappings. In response to the completion of process block 215 for the last of the multiple mappings, process block 220 will automatically execute once to pivot the enriched dataset for each of the multiple mappings into the custom logical columns to integrate the custom columns into the logical model. In this way, an entire data set of multiple custom physical columns is pivoted into associated logical columns.

In one embodiment, the steps of process block 220 are performed by mapping, definition, and pivot query module 715 of dynamic column inclusion module 710 as shown and described with reference to FIG. 7. These actions are automatically performed in real-time by the processor in response to the completion of process block 215.

Once the processor has thus completed pivoting the enriched dataset into the selected custom logical column in real time to integrate the custom logical column into the logical model, processing at process block 220 completes, and processing continues to process block 225.

At process block 225, the processor presents the logical model including the mapped custom logical columns for access in a business intelligence environment. The presented custom logical columns are therefore made available for use in the business intelligence environment, for example for use in reporting and data analysis applications or functions of business intelligence system 105.

In one embodiment, in response to the integration of the custom columns into the logical model (the completion of process block 220), the processor generates and transmits a message to the business intelligence system 105 instructing system 105 to refresh its data sources. In one embodiment, this message is generated and transmitted automatically. In response to the message, system 105 refreshes its data sources, making the logical model including the mapped custom logical column available for access. In one embodiment, the system presents the custom logical column accessible by text command. In one embodiment, the system presents the custom logical column in a GUI as a data source for access through the graphical user interface. For example, the access includes access by a data visualization tool configured to generate a graphical visualization based at least in part on the custom logical column. In one embodiment, the logical model is presented for access by other systems practically immediately, in real-time following integration of the custom logical column.

In one embodiment, the graphical visualization is referred to as data visualization (DV). A web-based data visualization graphical user interface is generated by the processor, for example by web interface server 130, and transmitted through an HTTP connection to a computer of enterprise network 115 for viewing and manipulation on a browser of that computer. In one embodiment, the user can drag and drop columns related to the dimensional model, including the custom logical column, and the GUI will alter a visualization presented on the data visualization graphical user interface.

In one embodiment, the steps of process block 225 are performed by mapping, definition, and pivot query module 715 of dynamic column inclusion module 710 as shown and described with reference to FIG. 7. These actions are automatically performed in real-time by the processor in response to the completion of process block 215.

Once the processor has thus completed presenting the logical model including the mapped custom logical columns for access in a business intelligence environment, processing at process block 225 completes, and processing continues to END block 230, where process 200 ends. On completion of process 200, the selected custom logical column is visible to and available for use by business intelligence system 105. Note that process 200 can be performed for multiple custom columns to make multiple custom columns available in business intelligence system 105.

—Example Pre-configuration of Placeholders in Logical Model—

Figure 3:
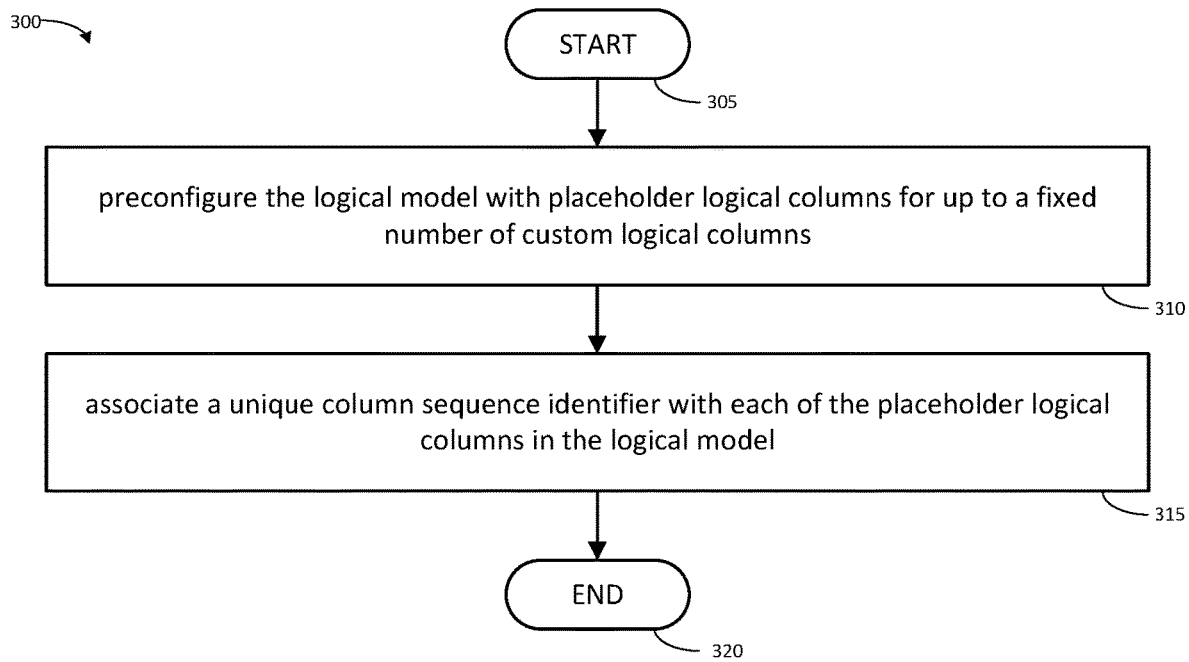
FIG. 3 illustrates one embodiment of a method for pre-configuring a logical model to dynamically accept custom columns associated with dynamic inclusion of custom columns into a logical model.

FIG. 3 illustrates one embodiment of a method 300 for pre-configuring a logical model to dynamically accept custom columns associated with dynamic inclusion of custom columns into a logical model. In one embodiment, the steps of method 300 are performed by dynamic custom columns inclusion system 120, for example by mapping, definition, and pivot query module 715 of dynamic column inclusion module 710 (as shown and described with reference to FIGS. 1 and 7, and elsewhere herein).

The method 300 may be initiated automatically based on various triggers, such as in response to receiving a signal over a network or parsing stored data indicating that (i) a user (or administrator) of dynamic custom columns inclusion system 120 has initiated method 300, (ii) method 300 is scheduled to be initiated at defined times or time intervals, or (iii) a new logical model is being initiated. The method 300 initiates at START block 305 in response to parsing a signal received or stored data retrieved and determining that the signal or stored data indicates that the method 300 should begin. Processing continues to process block 310.

At process block 310, the processor pre-configures the logical model with placeholder logical columns for up to a fixed number of custom logical columns. The selected custom logical column (described at method 200 process block 210 above) is selected from among the available placeholder logical columns not already mapped.

In one embodiment, the logical model is configured with placeholder logical columns to receive the values of custom columns in the physical layer. Because BI repository files are static, the number of placeholder logical columns is fixed. The number of placeholders is generally set at a sufficiently high value that users of the system will be unlikely to ever include more than that number of custom columns in the logical model. In one embodiment, the number of placeholder logical columns is set to 100.

In one embodiment, in response to a user input indicating that custom columns should be enabled in the logical model, the processor automatically adds a fixed number C (for example, C=100) of placeholder logical columns to each dimension of the dimensional model. For example, the processor may receive and execute a 'create logical dimension' method to add each of the placeholder logical columns to the logical model. This may be performed immediately in real-time, in response to user requests to enable logical columns, and without delay of waiting through the next ETL cycle before the C logical columns are available to represent custom logical columns. In one embodiment, to create the placeholder logical columns, the system defines additional metadata in (i) a table describing dimensions (or facts) and (ii) a table describing the columns of the dimension table in the BI repository (RPD) file for the logical model. Metadata indicating that a table is a custom table (or table with custom data) may also be included in the BI repository file. This metadata may be retrieved by executing a SQL SELECT statement for this information against the database catalog (which describes tables, columns, and other database objects. In one embodiment, the create logical dimension is performed as a loop repeated C times to create a series of uniquely labeled placeholder columns for user-defined attributes (UDAs), also known as custom columns. These may be labeled, for example UDA001-UDA00C. In one embodiment, the create logical dimension method includes the following steps: (1) identify a logical table associated with a dimension (a dimension table) to which the custom columns are to be added; (2) create a pivot transformer table of the placeholder columns; (3) join the pivot transformer table to the dimension table with a join, such as, in one embodiment, an outer join; (4) map all the created placeholder columns in the join; and (5) map the physical representation of the joined tables to the logical one.

Once the processor has thus completed pre-configuring the logical model with placeholder logical columns for up to a fixed number of custom logical columns, processing at process block 310 completes, and processing continues to process block 315.

At process block 315, the processor associates a unique column sequence identifier with each of the placeholder logical columns in the logical model.

In one embodiment, the processor names each column of the tables crated by the create table statement in process block 310. The processor may assign names for the columns of the table that indicate the dimension that the custom column is associated with, such as "Asset Attribute", as well as provide a unique user defined attribute number, UDA001-UDA . . . C. This unique user defined attribute number (with or without the "UDA" prefix) may be used as a column sequence identifier for the placeholder columns.

Once the processor has thus completed associating a unique column sequence identifier with each of the placeholder logical columns in the logical model, processing at process block 315 completes, and processing continues to END block 320, where process 300 ends. The logical model is now configured to accept dynamically included custom columns without extract, load, and transform (ETL) operations. Note that pre-configuration method 300 need occur only once in order to support addition of multiple custom columns (up to a maximum of the fixed number of placeholder logical columns) without ETL operations on the logical model.

—GUI Input to Initiate Dynamic Custom Column Inclusion—

In one embodiment, prior to beginning method 200, the processor accepts an input through a graphical user interface (GUI) indicating that the selected custom logical column is to be mapped to the custom physical column, wherein the mapping, retrieving, pivoting, and presenting steps are performed automatically in response to accepting the input. Thus, the input accepted through the GUI may serve as the trigger to start method 200 at start block 205. In one embodiment, the input accepted through the GUI may include a submission of a column sequence identifier and a custom physical column made by a GUI in response to selection of a button (for example, "update" button 660 as shown and described with reference to FIG. 6) in the GUI. The submitted column sequence identifier and information identifying the custom physical column are input by the user, and then transmitted to system 120 in response to the user's selection of a button. The processor in system 120 receives and accepts the submitted column sequence identifier and information identifying the custom physical column for mapping. In response to accepting these items for mapping, the processor in system 120 automatically performs the mapping, retrieving, pivoting, and presenting steps in order for the column sequence identifier and information identifying the custom physical column to cause the custom physical column to be available as a custom logical column in the logical model.

In one embodiment, a manual refresh of the data sources in the business intelligence environment may be needed prior to the presentation of the logical model including the mapped custom columns for access in the business intelligence environment. In this configuration, only the wherein the mapping, retrieving, and pivoting steps are performed automatically in response to accepting the input, and the presenting step is performed automatically in response to a manual refresh of the data sources following the completion of the mapping, retrieving, and pivoting steps.

—Dynamic Custom Column Removal—

Figure 4:
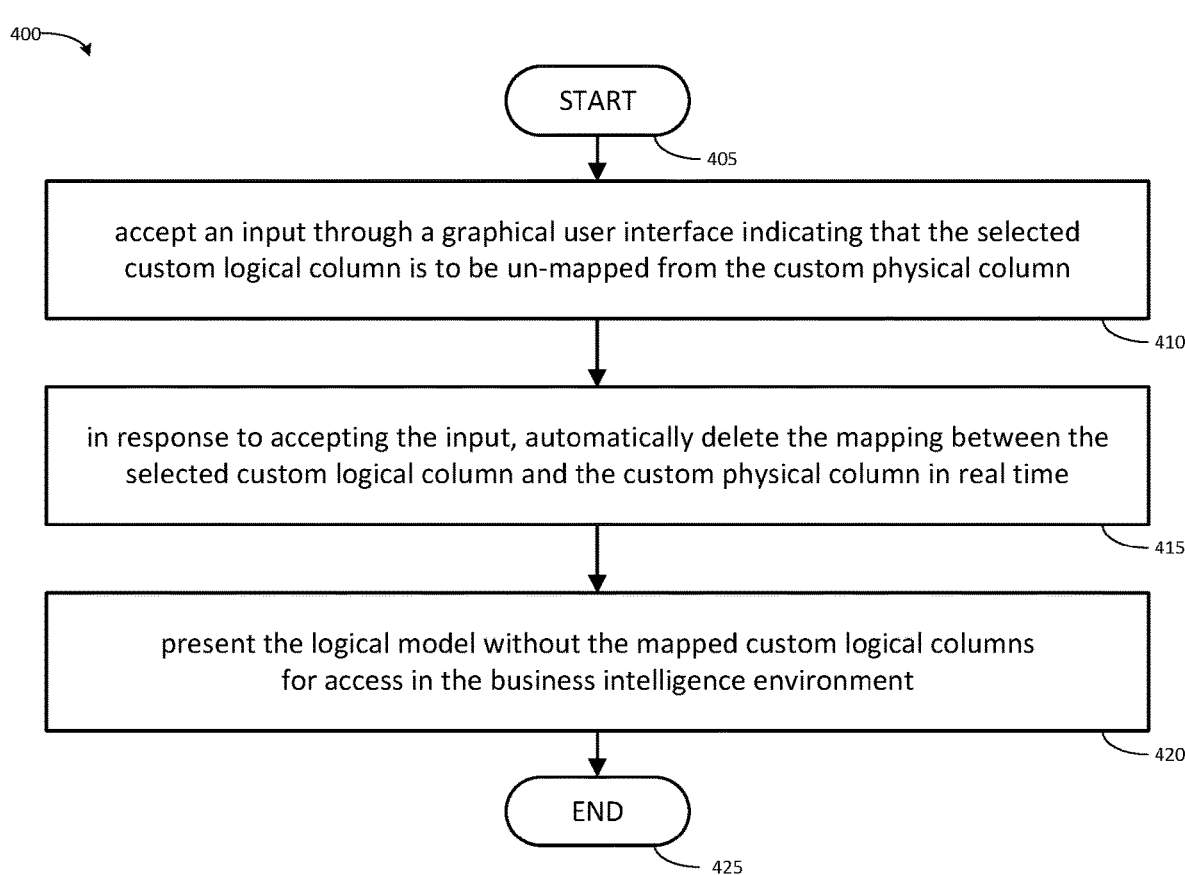
FIG. 4 illustrates one embodiment of a method for removing a dynamically included custom column associated with dynamic inclusion of custom columns into a logical model.

FIG. 4 illustrates one embodiment of a method 400 for removing a dynamically included custom column associated with dynamic inclusion of custom columns into a logical model. In one embodiment, the steps of method 400 are performed by dynamic custom columns inclusion system 120 (as shown and described with reference to FIGS. 1 and 7, and elsewhere herein). The method 400 initiates at START block 405 in response to parsing a signal received or stored data retrieved and determining that the signal or stored data indicates that the method 400 should begin. Processing continues to process block 410.

At process block 410, the processor accepts an input through a graphical user interface indicating that the selected custom logical column is to be un-mapped from the custom physical column.

In one embodiment, the processor receives and accepts an input from a user through a graphical user interface. The processor parses the input to determine that the input indicates that the mapping between the selected custom logical column and the custom physical column should be deleted, canceled, or otherwise removed. If so, then the processor has completed accepting an input through a graphical user interface indicating that the selected custom logical column is to be un-mapped from the custom physical column, processing at process block 410 completes, and processing continues to process block 415. If the input does not indicate that the mapping should be removed, then the process will not continue to process block 415.

At process block 415, in response to accepting the input the processor automatically deletes the mapping between the selected custom logical column and the custom physical column in real time.

In one embodiment, in response to the determination that the mapping should be removed, the processor automatically deletes the mapping by deleting the column sequence number from its association with the physical column. If the assignment of the column sequence identifier was stored in the configuration table, the column sequence identifier will be deleted from its location in the configuration table.

Once the processor has thus completed automatically deleting the mapping between the selected custom logical column and the custom physical column in real time, processing at process block 415 completes, and processing continues to process block 420.

At process block 420, the processor presents the logical model without the mapped custom logical columns for access in the business intelligence environment in a manner similar to that described at process block 225 of FIG. 2 for presenting the logical model with the mapped custom logical columns. Processing at process block 420 then completes, and processing continues to END block 425, where process 400 ends.

—Dimensional Model Representation—

In a business intelligence system such as system 105, a dimensional model describes data for the business intelligence system by relating facts to dimensions. The dimensional model is stored as a business intelligence platform repository file (also referred to as an RPD file or BI repository file). The BI repository file defines logical schemas, physical schemas, and physical-to-logical mappings. The BI repository file represents the dimensional model in three layers: physical layer, business model and mapping layer, and presentation layer. The physical layer defines the objects and relationships of the original data source. The business model and mapping layer defines the business or logical model of the data and specifies the mapping between the logical model and the physical schemas. The presentation layer controls the view of the logical model given to the users.

Figure 5:
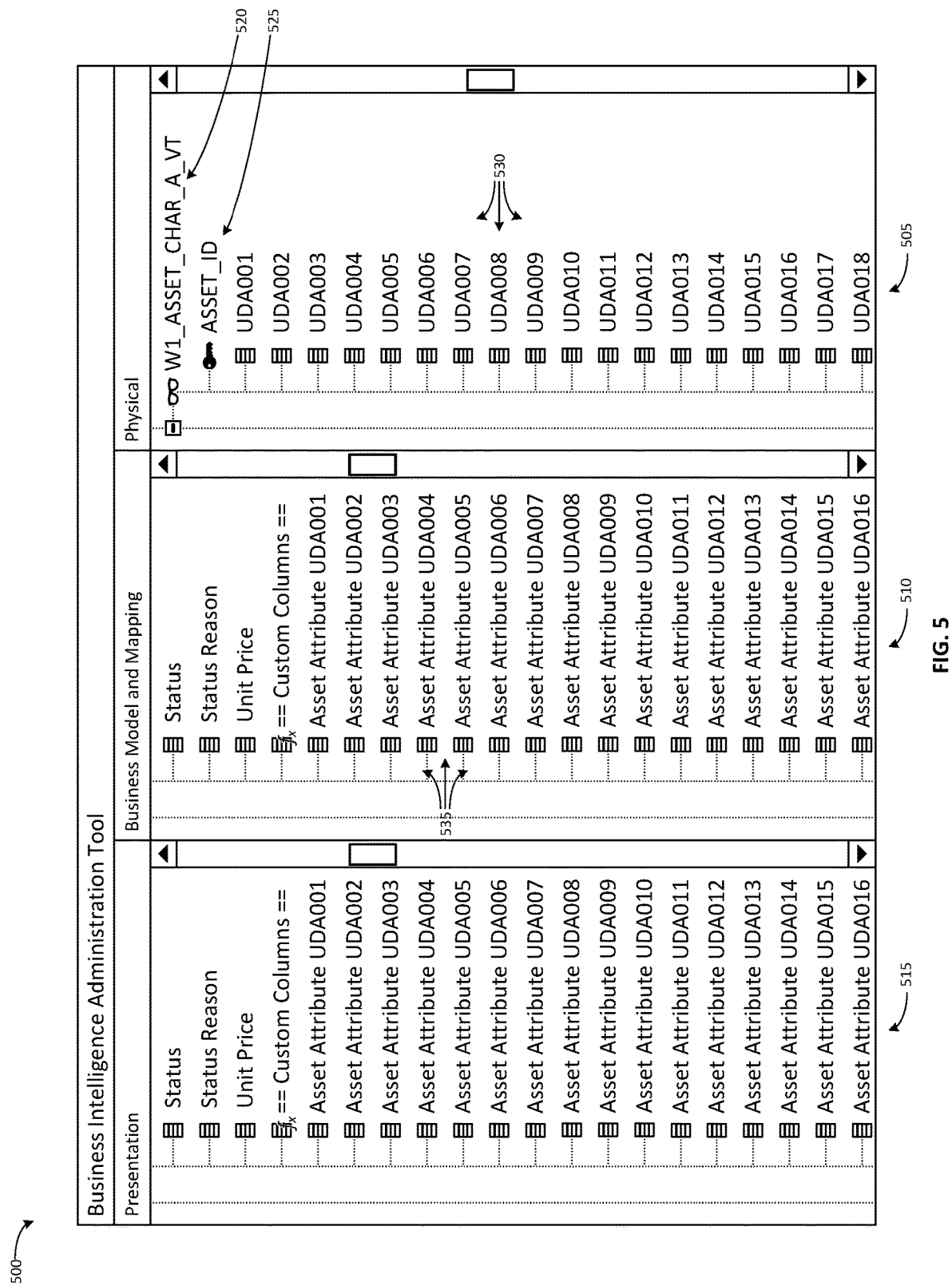
FIG. 5 illustrates an example of a business intelligence administration tool showing the layers of a dimensional model associated with dynamic inclusion of custom columns into a logical model.

FIG. 5 illustrates an example of a business intelligence administration tool 500 (a graphical user interface) showing the layers of an example dimensional model associated with dynamic inclusion of custom columns into a logical model. Tool 500 shows objects in the BI repository file that defines the dimensional model. Objects of the physical layer of the dimensional model are shown in physical layer viewer 505. Objects of the business model and mapping layer of the dimensional model are shown in business model and mapping layer viewer 510. Objects of the presentation layer of the dimensional model are shown in physical layer viewer 515.

A physical table is an object in a physical layer of a BI repository. The physical table represents or corresponds to a table in a data source such as a live operational database. For example, W1_ASSET_CHAR is a physical table with custom data, or a characteristic table. Table W1_ASSET CHAR is represented in the physical layer 505 by virtual table W1_ASSET_CHAR_A_VT 520. Virtual table W1_ASSET_CHAR_A_VT 520 is also a characteristic table, or table of custom values, but is created automatically by a BI repository (RPD) generator tool used to create a BI repository (RPD) file describing the logical model. The table definition of virtual table W1_ASSET_CHAR_A_VT 520 is an inline view definition, and virtual table W1_ASSET_CHAR_A_VT 520 is an inline view of a data set composed of multiple physical tables. In particular, virtual table W1_ASSET_CHAR_A_VT 520 is defined by a query (such as a SQL query) that when executed causes the system to perform the steps of at least method 200, as shown and described herein. The query forms virtual table W1_ASSET_CHAR_A_VT 520 from physical table W1_ASSET_CHAR, custom metadata, and mapping metadata and implementing by the mapping operation. Virtual table W1_ASSET_CHAR_A_VT 520 includes a key object ASSET ID 525 and numerous custom physical columns UDA001-UDA . . . N 530 expressed as rows of virtual table 520.

A logical entity, such as a logical column, is an object in the business model and mapping layer that is generated from objects in the physical layer. In one embodiment, the BI repository file is used by a business intelligence system such as system 105 to map physical tables to logical entities that represent a star schema. The star schema logically relates dimension tables that describe items (people, places, and things) and a fact table that stores metrics (measurements, observations, or events) about the items. Custom logical columns 535 are one example of logical entities that are generated logically from objects in the physical layer.

—Assigning Custom Business Names in the Presentation Layer—

In one embodiment, descriptive names (if available) may be assigned to each of the custom logical columns, for example as part of or preceding the presentation steps process block 225 of method 200. The descriptive names indicate the type of information represented by the custom logical column. This descriptive name may have a human-readable business meaning to the user, or at least be understood by the user to specify a particular type of information.

In one embodiment, the descriptive name may be assigned by a user using a GUI to initially configure a mapping of a custom physical column to a custom logical column. For example, when a user creates an input to map a custom physical column to a custom logical column in the logical model, the user enters a descriptive name of what the physical column represents. In response to receiving the descriptive name, the processor stores the descriptive name in a name field for the logical column being mapped, for example in the configuration table for the logical model.

Alternatively, the descriptive name is assigned to the custom physical column, and is accessed through the mapping, if the mapping has been performed. In one embodiment, metadata to define custom data such as metadata to define the descriptive (business) name is separate from the metadata for mapping map a custom physical column to a custom logical column. The descriptive name is defined as part of a custom physical column definition process when the custom physical columns are created for use in an underlying business application that the business intelligence system 105 draws information from. This custom column definition process is independent of the custom column mapping process to create the custom logical columns. The metadata to define custom data is used by the underlying business application and therefore the naming of custom physical columns is separate from the business-intelligence-related functionality.

In one embodiment, the descriptive name may be stored in a separate metadata table to support internationalization. The definition of labels (including the descriptive name) in multiple languages is allowed and the user selects a language during login to the business intelligence service. The descriptive name (and other labels) in the selected language are integrated into the presented logical model as one of the last steps before presentation. The descriptive names for the custom logical columns in the selected language are retrieved when the user logs into the system and in response to the user's login, the descriptive names in the selected language are integrated for the specific user. Thus, when the logical model is shown, the business intelligence system merges the logical model information with the dynamically retrieved labels. In one embodiment, the separate metadata table includes codes associated with each custom column, and then a descriptive name in each available language (such as English, French, Spanish, German, Chinese, Japanese, etc.) for that custom column. The code associated with the column may serve as a key to the metadata table.

In one embodiment, the processor assigns the mapped custom logical column a business name that represents the definition of the custom physical column. In order to do so, the processor automatically inserts the statement "VALUEOF(name field for the column)" into a custom display name function of the presentation level. The processor automatically evaluates this statement and retrieves the value of the stored name field for the column: the user-provided descriptive name of what the physical column represents. The processor automatically assigns the retrieved descriptive name to be the custom display name in the presentation layer.

In one embodiment, the functions for automatically assigning a business name are performed by dynamic custom columns inclusion system 120, for example by business name assignment module 725 of dynamic column inclusion module 710 (as shown and described with reference to FIGS. 1 and 7, and elsewhere herein).

—Hiding Unmapped Custom Columns in the Presentation Layer—

As described herein, there are potentially hundreds or thousands of placeholder logical columns, many, or even the majority of which will not be mapped. For example, in one implemented example system, there are more than 21,000 of these custom column placeholders. If a custom logical column is unmapped—that is, not populated by the values of a custom physical column-then the column is of no use to the user of business intelligence system 105. Also, the unmapped columns present visual clutter that reduces usability of the mapped columns among them. The business intelligence system 105 enables conditional hiding of information. Accordingly, these unmapped placeholder logical columns can be automatically made invisible in the presentation layer. While mapping a particular logical column to a custom physical column does not necessarily mean that there is a value in the logical column, the mapping makes it possible that there could be a value there, and therefore the user should have access to the logical column. A column should be hidden if it is unmapped.

In one embodiment, this is enabled by leveraging the existing mapping information, and in particular, the value of the stored name field for the column. As discussed above, mapped logical columns are assigned a descriptive name of what the underlying physical column represents. (Or, alternatively, the descriptive name is assigned to the custom physical column, and is accessed through the mapping, if the mapping has been performed.) A logical column that is unmapped will not be assigned a descriptive name. Therefore, an expression determining that a column has no mapping can be based on the absence of a descriptive name. The processor evaluates the expression to control whether or not the column should be hidden.

In one embodiment, the processor automatically hides all unmapped custom logical columns when presenting the logical model for access. In order to do so, the processor executes a function to conditionally hide an object on an expression that is true when there is a value for the name field of a custom logical column object, and that is false when there is no value for the name field of the custom logical column object. For example, the processor automatically inserts the statement VALUEOF(name field for the column)="-" into a conditional "hide object if" function of the presentation level. This statement will evaluate as true if the null value "-" is found in the name field for the column. As discussed above, the name field will be null if there is no mapping. If the processor determines that the statement evaluates as true, the processor will automatically execute the hide function for the associated column object. The unnamed, unmapped logical column will not be displayed in the presentation layer.

In one embodiment, the functions for automatically hiding unmapped custom logical columns are performed by dynamic custom columns inclusion system 120, for example by hide unmapped columns module 720 of dynamic column inclusion module 710 (as shown and described with reference to FIGS. 1 and 7, and elsewhere herein).

—Example Query for Dynamic Inclusion of Custom Columns—

In one embodiment, the mapping, retrieving, and pivoting steps of method 200 are performed as part of the execution of a single query. One example query for dynamic inclusion of custom columns is shown below. (In the example query, the maximum available custom logical columns is set to 4 for convenience in showing the query. In one embodiment, the maximum available custom logical columns would be set to 100, or even higher.)

```
         05   10    15    20    25    30    35    40    45    50    55    60    65
01   SELECT ASSET_ID,
02       min(decode(TARGET_COL, '1', CASE trim(SRC_CHAR_TBL_COL)
03           WHEN 'ADHOC_CHAR_VAL' THEN ADHOC_CHAR_VAL
04           ELSE DEFINED_CHAR_VAL END)) UDA001,
05       min(decode(TARGET_COL, '2', CASE trim(SRC_CHAR_TBL_COL)
06           WHEN 'ADHOC_CHAR_VAL' THEN ADHOC_CHAR_VAL
07           ELSE DEFINED_CHAR_VAL END)) UDA002,
08       min(decode(TARGET_COL, '3', CASE trim(SRC_CHAR_TBL_COL)
09           WHEN 'ADHOC_CHAR_VAL' THEN ADHOC_CHAR_VAL
10           ELSE DEFINED_CHAR_VAL END)) UDA003,
11       min(decode(TARGET_COL, '4', CASE trim(SRC_CHAR_TBL_COL)
12           WHEN 'ADHOC_CHAR_VAL' THEN ADHOC_CHAR_VAL
13           ELSE DEFINED_CHAR_VAL END)) UDA004,
14   FROM (
15       SELECT TBL.ASSET_ID,
16           trim(E.CHAR_SEQ_NUM)TARGET_COL,
17           TBL.CHAR_TYPE_CD,
18           E.SRC_CHAR_TBL_COL,
19           L.DESCR DEFINED_CHAR_VAL,
20           TBL.ADHOC_CHAR_VAL,
21           ROW_NUMBER( ) OVER(PARTITION BY TBL.ASSET_ID,
22               TBL.CHAR_TYPE_CD, E.CHAR_SEQ_NUM
```

```
23              ORDER BY TBL.EFFDT DESC)
24      FROM W1_ASSET_CHAR TBL
25           LEFT OUTER JOIN CI_CHAR_VAL_L_L ON (TBL.CHAR_TYPE_CD =
26                L.CHAR_TYPE_CD AND TBL.CHAR_VAL = L.CHAR_VAL)
27           LEFT OUTER JOIN F1_ETL_MP_CTRL_E on (TBL.CHAR_TYPE_CD =
28                E.CHAR_TYPE_CD
29                AND trim(E.TARGET_TBL) = 'W1_ASSET'
30                AND trim(E.SRC_CHAR_TBL) = 'W1_ASSET_CHAR')
31      WHERE TARGET_COL is not null
32           AND trim(BUS_OBJ_CD) = 'F1-CharMapping'
33           AND (L.LANGUAGE_CD =
34                'VALUEOF(NQ_SESSION.ASSET_LANGUAGE)'
35           AND TBL.EFFDT <= sysdate
```

The example query is written in structured query language (SQL). In one embodiment, the example query is contained in the virtual table W1_ASSET_CHAR_A_VT 520 discussed above. In the example query, there are two nested select statements: an inner select statement from lines 15-30 and an outer select statement from lines 1-30. The inner select statement retrieves metadata defining custom column metadata (e.g. the column type and the associated label) and combines it with the custom column values in "W1_ASSET_CHAR TBL" at lines 24-26. The inner select statement also joins—in this case a Left Outer Join—the retrieved metadata with the mapping information at lines 27-30. The join of the retrieved metadata and the mapping information results in an enriched dataset of records. After creation of the enriched dataset of records, the outer select statement pivots the enriched dataset of records generated by the inner select statement into the appropriate target column, as shown at lines 2-13. In each decode statement, the target column is searched for each column sequence identifier in turn: "TARGET_COL, 'N'" where N=1, 2, 3, 4, and so on to the maximum number of logical columns. The numbered UDA00N are each placeholder logical columns included in the logical model during the initial configuration (pre-configuration) of the logical model. So, the value of the target column is evaluated to determine whether it has been assigned each possible column sequence identifier in turn. If the value of the target column matches a sequence identifier, the enriched dataset of records is pivoted into the placeholder logical column associated with that column sequence identifier. Placeholder logical columns that are not indicated by target column do not receive the dataset of records. In one embodiment, BI system 105 may include an integrated pivot function (such as the Oracle DB SQL Pivot extension) generates a pivot result in a more efficient manner. Where an integrated pivot function is available lines 2-13 may be replaced by a call to the pivot function for the rows UDA001-UDA004.

In one embodiment, the single query for mapping, retrieving, and pivoting forms an SQL-based mapping layer between logical model columns and a physical table that represents the custom columns as rows.

—Live Data Sources—

In one embodiment, the physical data sources for the logical model are operational databases that are "live," or currently receiving and recording streams of operational data. Reporting on a live operational database provides access to real-time operational data, in contrast to reporting on a data warehouse, where the reporting provides access to data that is periodically extracted from a live operational database, but static in the time between extractions. The term reporting, as used here, refers to data retrieval from a data store. In one embodiment, the logical model describes star schemas built on top of tables in the operational database. The star schemas join logically related tables together to represent business processes to provide business intelligence. In one embodiment, the logical model is reporting on a live operational database. In one embodiment, the logical model is reporting on a live recovery mirror of a live operational database. Reporting on the recovery mirror—a parallel copy of the operational database that is more or less idle except for receiving duplicate operational information—reduces load on the live operational database while providing similar access to real time data.

—Example GUI—Enabling Custom Attributes—

Figure 6:
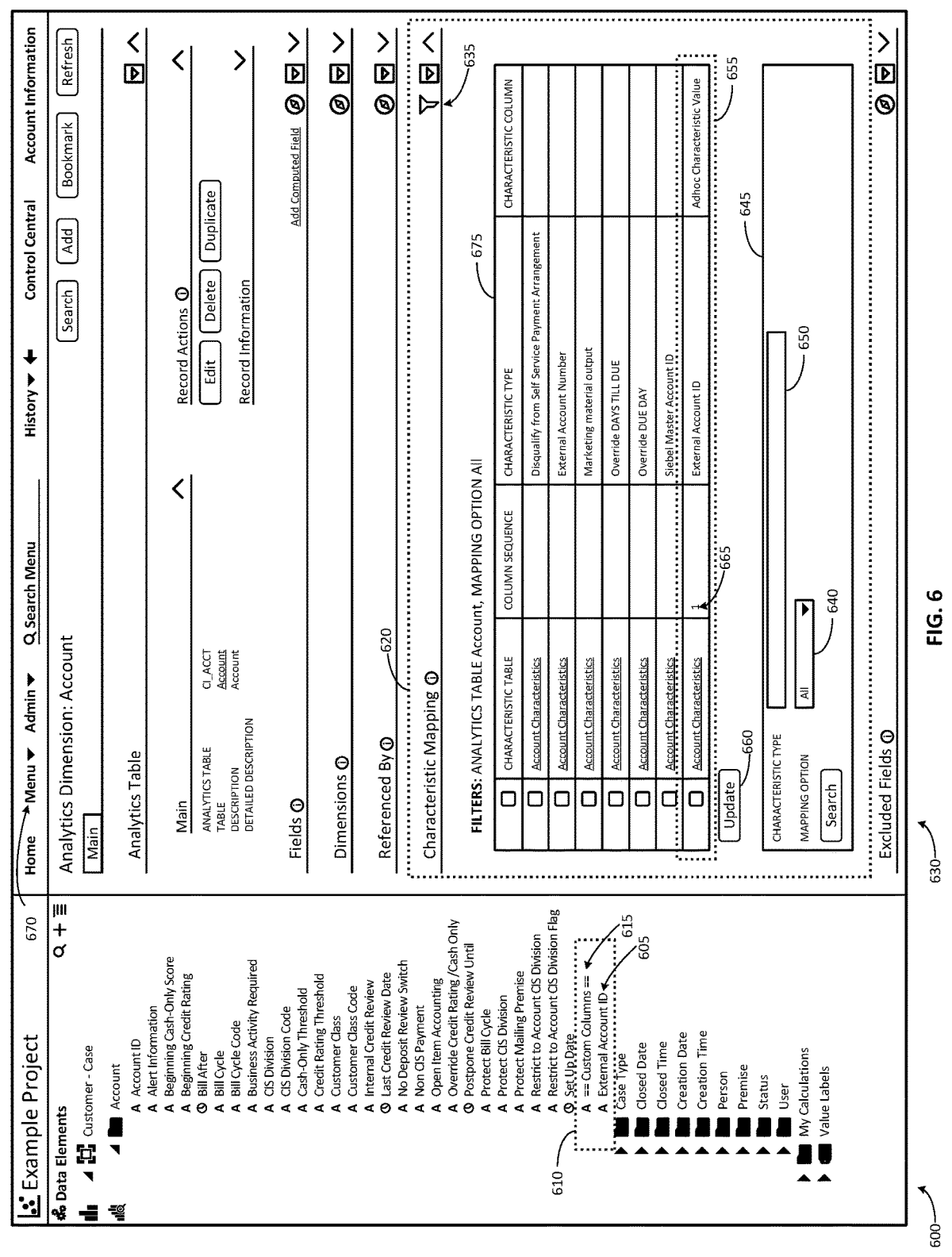

Note that custom data may also be referred to herein as "characteristics." FIG. 6 illustrates one embodiment of a GUI 600 for enabling and mapping characteristics to custom columns associated with dynamic inclusion of custom columns into a logical model.

In one embodiment, business applications such as Oracle® Utilities business applications manage custom data in characteristics tables that are associated with a solution's maintenance objects. Characteristics of the type Predefined Value and Ad Hoc Value may also be exposed in subject areas of DV tools such as Oracle® Utilities Analytics Visualization so they can be used for analysis and data visualization.

In one embodiment, custom values defined by characteristics types (custom column definitions) appear as columns with data type VARCHAR in dimension tables after the characteristics types have been mapped to target dimensions in the DV tool. For example, in FIG. 6, the Account dimension includes the characteristic type External Account ID 605. Characteristics are displayed at the end of the dimension folder 610 below the separator==Custom Columns==615.

—Example GUI—Map Characteristics to Dimensions—

As discussed above, each dimension's underlying object support characteristic tables has been created with a set of empty or free columns, which can be used by implementation teams to map characteristics. Each of these free columns has a unique identifier known as its Column Sequence. To map a characteristic to a target dimension in the DV tool means to select a characteristic type of a table in the transactional application, and to map it to a free dimension column identified by its Column Sequence number. In one embodiment, this may be performed in the characteristic mapping zone 620 of GUI 600.

The Column Sequence also determines the order in which characteristics are displayed in the dimension folder. During implementation, the customer may choose to change the Column Sequence number of characteristics or even remove mappings by changing or deleting the sequence number. Note that changing the Column Sequence of a characteristic may break or modify analytic canvases that use the column's previous position. In one embodiment, the mapping of characteristics in the transactional application to dimensions in the analytics application should be performed by a customer user who is an authorized application administrator, and this restriction may be enforced by an applicable user authorization policy.

In one embodiment, to map a characteristic to a dimension as a customer user of the GUI 600:
1. In the Search Menu of the enterprise or business application (such as Customer Cloud Service, Meter Solution Cloud Service, or Work and Asset Cloud Service for example), enter the Analytics Table. In response, an Analytics Table Search page is displayed.
2. Search for the dimension. In response, a set of results is displayed.
3. Select the description link of the table where characteristics are to be mapped. In response to selecting the description link, the Analytic Dimension page 630 is shown.
4. Expand the Characteristic Mapping zone 620. Characteristic Mapping zone 620 manages characteristic mapping extensions for the dimensions. By default, only mapped characteristics are listed.
5. In the Characteristic Mapping zone, click the filter icon 635 to search for a characteristic. To facilitate the search, the user can use the mapping options 640 available in search zone 645 to display all mapped and unmapped characteristics (as shown), or all mapped characteristics, or all unmapped characteristics. The characteristics can further be narrowed by entering a characteristic type at 650.
6. Select one or more characteristic types that is to be mapped (for example External Account ID at 655) by checking the check box and click Update 660. This allows mappings to be adjusted for a selected list of characteristics.
7. Specify a value for the Column Sequence to create a mapping. In the example shown, Column Sequence value 1 is specified, as shown at reference 665.

Since Column Sequences are unique identifiers of dimension columns, the values that specified must also be unique. For example, it is good practice to number the column sequence starting at 1 and increasing by 1.

If the characteristic mapping was performed while a user was editing a project, then the user can view the new characteristics by clicking Menu 670 on the project toolbar and click Refresh Data Sets. In response to clicking Refresh Data Sets, the newly mapped characteristics will become visible in the project, for example displayed at the end of the dimension folder 610 below the separator==Custom Columns==615.

To remove a characteristic mapping to a dimension:
1. In the Characteristic Mapping zone 620, press the filter icon 635 to search for the characteristic.
2. Select the characteristic types that is to be un-mapped from among the displayed results 675 and click Update 660.
3. Delete the Column Sequence for the mapping and click Save.

Note that removing the Column Sequence of a characteristic will break the analytics canvases that used the mapped column sequence.

—Software Module Embodiments—

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Figure 7:
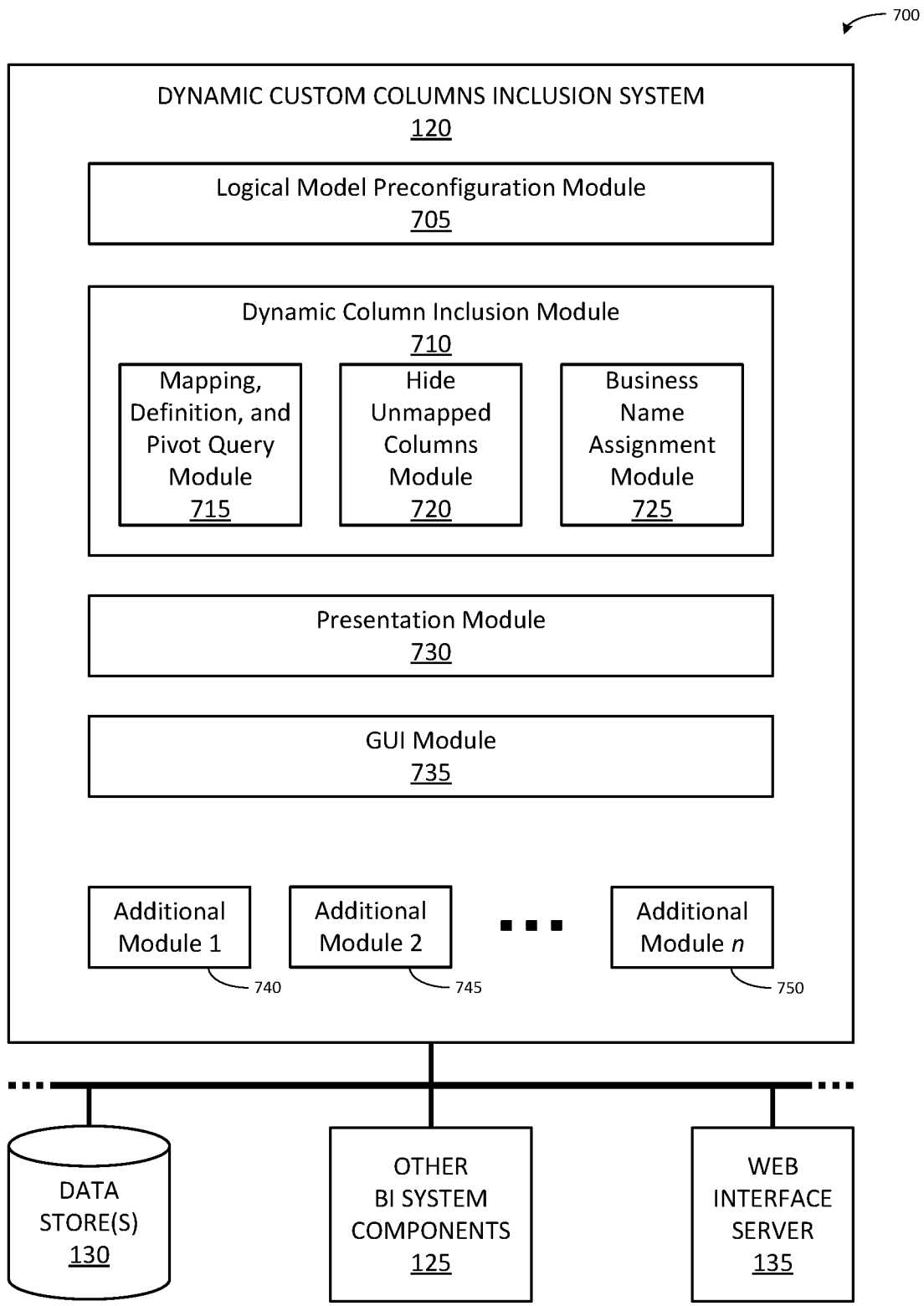
FIG. 7 illustrates one embodiment of a business intelligence system associated with dynamic inclusion of custom columns into a logical model showing a more detailed view of dynamic custom columns inclusion components.

FIG. 7 illustrates a more detailed view 700 of one embodiment of dynamic custom columns inclusion system 120. dynamic custom columns inclusion system 120 may include a logical model pre-configuration module 705. In one embodiment, logical model pre-configuration module 705 includes stored software instructions that when executed by a processor cause dynamic custom columns inclusion system 120 to perform the functions described with reference to process blocks 310-315 of FIG. 3.

Dynamic custom columns inclusion system 120 may include a dynamic column inclusion module 710. In one embodiment, dynamic column inclusion module 710 includes mapping, definition and pivot query module 715, hide unmapped columns module 720, and business name assignment module 725. In one embodiment, mapping, definition and pivot query module 715 includes stored software instructions that when executed by a processor cause dynamic custom columns inclusion system 120 to perform the functions described with reference to process blocks 210-220 of FIG. 2 and/or the functions described with reference to the example query for dynamic inclusion of custom columns. In one embodiment, hide unmapped columns module 720 includes stored software instructions that when executed by a processor cause dynamic custom columns inclusion system 120 to perform the functions described with reference to hiding unmapped custom columns in the presentation layer. In one embodiment, business name assignment module 725 includes stored software instructions that when executed by a processor cause dynamic custom columns inclusion system 120 to perform the functions described with reference to assigning custom business names in the presentation layer.

Dynamic custom columns inclusion system 120 may include a presentation module 730. In one embodiment, presentation module 730 includes stored software instructions that when executed by a processor cause dynamic custom columns inclusion system 120 to perform the functions described with reference to process block 225 of FIG. 2 and other user interactions with business intelligence system 105, or through the presentation layer.

Dynamic custom columns inclusion system 120 may include a GUI module 735. In one embodiment, GUI module 735 includes stored software instructions that when executed by a processor cause dynamic custom columns inclusion system 120 to perform the functions described with reference to FIG. 6, interactions with users through web GUIs or other interfaces presented on computers of enterprise network 115, and other user interactions described herein.

Dynamic custom columns inclusion system 120 may include one or more additional modules 745, 745, 750. In one embodiment, one or more of the additional modules 745, 745, 750 include stored software instructions that when executed by a processor cause dynamic custom columns inclusion system 120 to perform other functions described herein.

—Cloud or Enterprise Embodiments—

In one embodiment, the present system (such as business intelligence system 105) is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the present system is a centralized server-side application that provides at least a graphical user interface including one or more of the functions disclosed herein and that is accessed by many users via computing devices/terminals communicating with the present computing system (functioning as the server) over a computer network.

—Computing Device Embodiments—

Figure 8:
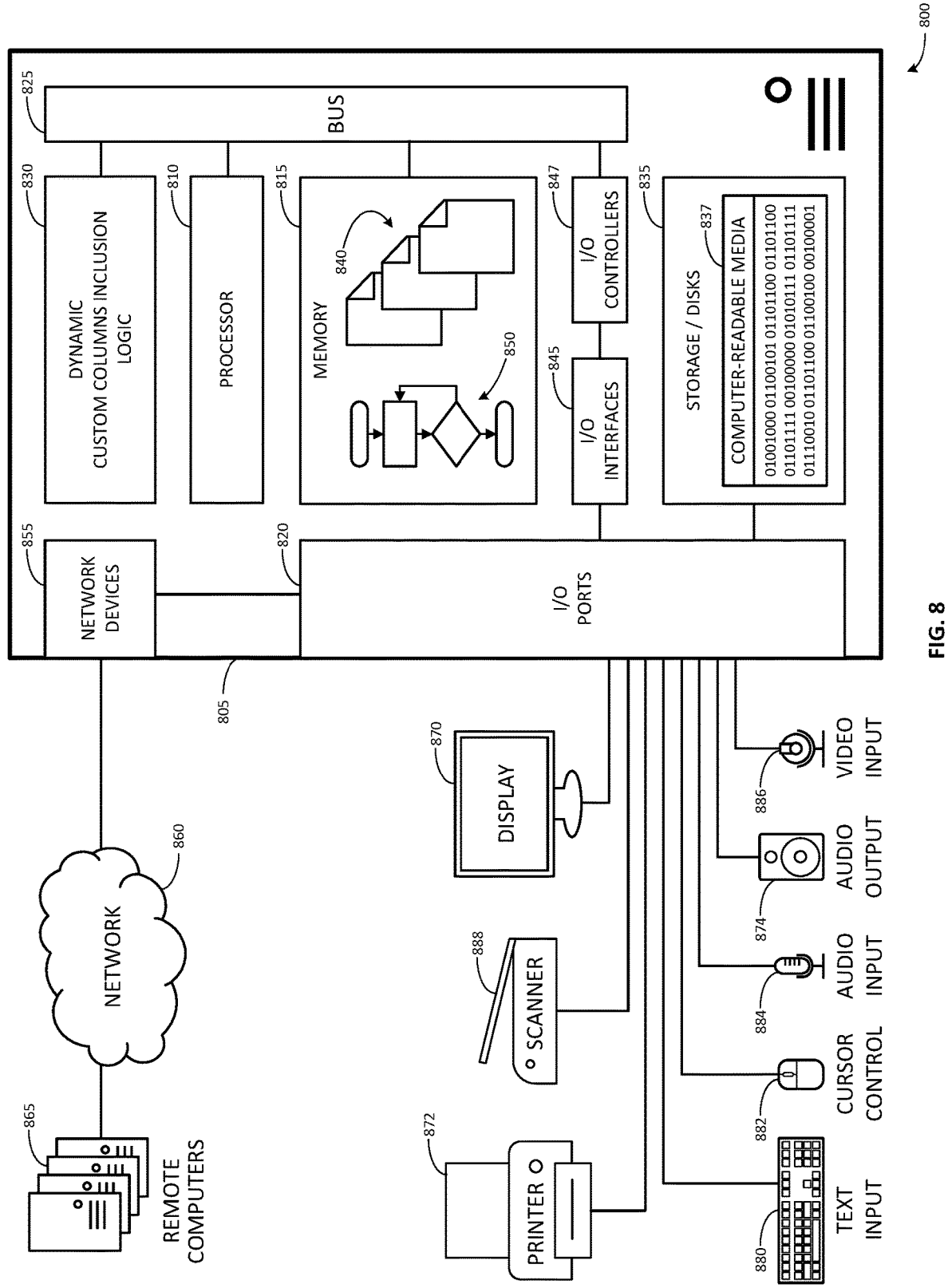
FIG. 8 illustrates an embodiment of a computing system configured with the example systems and/or methods disclosed.

FIG. 8 illustrates an example computing system 800 that is configured and/or programmed as a special purpose computing device with one or more of the example systems and methods described herein, and/or equivalents. The example computing device may be a computer 805 that includes a processor 810, a memory 815, and input/output ports 820 operably connected by a bus 825. In one example, the computer 805 may include dynamic custom columns inclusion logic 830 configured to facilitate dynamic inclusion of custom columns into a logical model similar to the logic, systems, and methods shown and described with reference to FIGS. 1-8. In different examples, the dynamic custom columns inclusion logic 830 may be implemented in hardware, a non-transitory computer-readable medium with stored instructions, firmware, and/or combinations thereof. While the dynamic custom columns inclusion logic 830 is illustrated as a hardware component attached to the bus 825, it is to be appreciated that in other embodiments, the dynamic custom columns inclusion logic 830 could be implemented in the processor 810, stored in memory 815, or stored in disk 835 on computer-readable media 837.

In one embodiment, dynamic custom columns inclusion logic 830 or the computing system 800 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform dynamic inclusion of custom columns into a logical model. The means may also be implemented as stored computer executable instructions that are presented to computer 805 as data 840 that are temporarily stored in memory 815 and then executed by processor 810.

Dynamic custom columns inclusion logic 830 may also provide means (e.g., hardware, non-transitory computer-readable medium that stores executable instructions, firmware) for performing dynamic inclusion of custom columns into a logical model.

Generally describing an example configuration of the computer 805, the processor 810 may be a variety of various processors including dual microprocessor and other multi-processor architectures. A memory 81015 may include volatile memory and/or non-volatile memory. Non-volatile memory may include, for example, ROM, PROM, EPROM, EEPROM, and so on. Volatile memory may include, for example, RAM, SRAM, DRAM, and so on. A storage disk 835 may be operably connected to the computer 805 by way of, for example, an input/output (I/O) interface (for example, a card or device) 845 and an input/output port 820 that are controlled by at least an input/output (I/O) controller 847. The disk 835 may be, for example, a magnetic disk drive, a solid-state disk drive, a floppy disk drive, a tape drive, a Zip drive, a flash memory card, a memory stick, and so on. Furthermore, the disk 835 may be a CD-ROM drive, a CD-R drive, a CD-RW drive, a DVD ROM, and so on. The memory 815 can store a process 850 and/or data 840 formatted as one or more data structures, for example. The disk 835 and/or the memory 815 can store an operating system that controls and allocates resources of the computer 805. The computer 805 may interact with, control, and/or be controlled by input/output (I/O) devices via the input/output (I/O) controller 847, the I/O interfaces 845 and the input/output ports 820. The input/output devices include one or more displays 870, printers 872 (such as inkjet, laser, or 3D printers), and audio output devices 874 (such as speakers or headphones), text input devices 880 (such as keyboards), a pointing and selection device 882 (such as mice, trackballs, touchpads, touch screens, joysticks, pointing sticks, stylus mice), audio input devices 884 (such as microphones), video input devices 886 (such as video and still cameras), video cards (not shown), disk 835, network devices 855, and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network 860, the computer 805 may be logically connected to remote computers 865. Networks with which the computer 805 may interact include, but are not limited to, a LAN, a WAN, and other networks.

—Selected Advantages—

Systems and methods described herein enable immediate, real-time availability of user-configured custom columns added dynamically to a static logical model. Such immediate real-time availability of user-configured custom columns in a logical model was not previously possible to computing devices because the logical model (and the underlying data structure representing the logical model) is static, and cannot be re-configured on the fly. The systems and methods described herein overcome that difficulty by pre-configuring the logical model to accept a pre-set number of placeholder logical columns that can be dynamically mapped, re-mapped, or un-mapped on the fly to user-configured custom columns. The systems and methods described herein were not previously practiced, but are a technique necessarily rooted in computer technology to overcome a problem specific to logical models. Without the systems and methods described herein, any change to the logical model must wait until the next ETL cycle is complete before the change takes effect. With the systems and methods described herein, the changes take effect immediately, in real-time. This is possible even though the logical model remains static due to the specific features of the systems and methods described herein. Thus, the BI system is able to create reports and other business intelligence using custom information that operate on a real-time system.

Also, the systems and methods described herein enable automatic application of a descriptive business name to the logical model through the mapping of the custom physical column to the custom logical column in the logical model. The descriptive name for the custom column is automatically populated in the presentation layer, increasing the understanding by users as to the content of the custom column.

Also, the systems and methods described herein are visually tidy because they enable automatic hiding of unmapped custom columns.

—Definitions and Other Embodiments—

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

API: application programming interface.
ASIC: application-specific integrated circuit.
BI: business intelligence.
CD: compact disk.
CD-R: CD recordable.
CD-RW: CD rewriteable.
DRAM: dynamic RAM.
DV: data visualization.
DVD: digital versatile disk and/or digital video disk.
EEPROM: electrically erasable PROM.
EPROM: erasable PROM.
ETL: extract, load, and transform.
GUI: graphical user interface.
HTTP: hypertext transfer protocol.
IAAS: infrastructure-as-a-service.
LAN: local area network.
OAC: Oracle® Analytics Cloud.
OAS: Oracle® Application Server.
OBIEE: Oracle® Business Intelligence Enterprise Edition.
PAAS: platform-as-a-service.
PCI: peripheral component interconnect.
PCIE: PCI express.
PROM: programmable ROM.
RAM: random access memory.
ROM: read only memory.
SAAS: software-as-a-service.
SQL: structured query language.
SRAM: synchronous RAM.
UGBU: Oracle® Utility Global Business Unit.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method for dynamic inclusion of custom columns into a logical model, the method comprising:
    mapping a selected custom logical column in the logical model to a custom physical column represented as a row in a physical table in real time by assigning a column sequence identifier uniquely associated with the selected custom logical column to the custom physical column;
    retrieving a custom column definition for the custom physical column in real time to form an enriched dataset of custom column records from the custom column definition and the assigned column sequence identifier;
    pivoting the enriched dataset into the selected custom logical column in real time to integrate the custom logical column into the logical model; and
    presenting the logical model including the mapped custom logical columns for access in a business intelligence environment.

2. The method of claim 1, further comprising:
    pre-configuring the logical model with placeholder logical columns for up to a fixed number of custom logical columns, wherein the selected custom logical column is selected from among the available placeholder logical columns not already mapped; and
    associating a unique column sequence identifier with each of the placeholder logical columns in the logical model.

3. The method of claim 1, further comprising hiding all unmapped custom logical columns when presenting the logical model for access.

4. The method of claim 1, wherein the mapping, retrieving, and pivoting steps are performed as part of the execution of a single query.

5. The method of claim 1, further comprising storing the assignment of the column sequence identifier to the custom physical column that describes the mapping in a configuration table of mappings for the logical model.

6. The method of claim 1, further comprising accepting an input through a graphical user interface indicating that the selected custom logical column is to be mapped to the custom physical column, wherein the mapping, retrieving, pivoting, and presenting steps are performed automatically in response to accepting the input.

7. The method of claim 1, further comprising:
    accepting an input through a graphical user interface indicating that the selected custom logical column is to be un-mapped from the custom physical column;
    in response to accepting the input, automatically deleting the mapping between the selected custom logical column and the custom physical column in real time; and
    presenting the logical model without the mapped custom logical columns for access in the business intelligence environment.

8. The method of claim 1, wherein the access includes access by a data visualization tool configured to generate a graphical visualization based at least in part on the custom logical column.

9. A non-transitory computer-readable medium storing computer-executable instructions for dynamic inclusion of custom columns into a logical model that, when executed by at least a processor of a computer, cause the computer to:
    map a selected custom logical column in the logical model to a custom physical column represented as a row in a physical table in real time by assigning the column sequence identifier of the selected custom logical column to the custom physical column;
    retrieve a custom column definition for the custom physical column in real time to form an enriched dataset of custom column records from the custom column definition and the assigned column sequence identifier;

pivot the enriched dataset into the selected custom logical column in real time to integrate the custom logical column into the logical model; and present the logical model including the mapped custom logical columns for access in a business intelligence environment.

10. The non-transitory computer readable medium of claim 9, wherein the instructions further cause the computer to:
pre-configure the logical model with placeholder logical columns for up to a fixed number of custom logical columns, wherein the selected custom logical column is selected from among the available placeholder logical columns not already mapped; and
associate a unique column sequence identifier with each of the placeholder logical columns in the logical model.

11. The non-transitory computer readable medium of claim 9, wherein the instructions further cause the computer to hide all unmapped custom logical columns when presenting the logical model for access.

12. The non-transitory computer readable medium of claim 9, wherein the instructions further cause the computer to assign the mapped custom logical column a business name that represents the definition of the custom physical column.

13. The non-transitory computer readable medium of claim 9, wherein the logical model is reporting on a live recovery mirror of a live operational database including the physical table.

14. The non-transitory computer readable medium of claim 9, wherein the instructions further cause the computer to accept an input through a graphical user interface indicating that the selected custom logical column is to be mapped to the custom physical column, wherein the mapping, retrieving, and pivoting steps are performed automatically in response to accepting the input.

15. The non-transitory computer readable medium of claim 9, wherein the instructions further cause the computer to:
accept an input through a graphical user interface indicating that the selected custom logical column is to be un-mapped from the custom physical column;
in response to accepting the input, automatically delete the mapping between the selected custom logical column and the custom physical column in real time; and
present the logical model without the mapped custom logical columns for access in the business intelligence environment.

16. A computing system for dynamic inclusion of custom columns into a logical model, the system comprising:
a processor;
a memory operably connected to the processor;
a non-transitory computer-readable medium operably connected to the processor and memory and storing computer-executable instructions that when executed by at least a processor of a computer cause the computer to:
map a selected custom logical column in the logical model to a custom physical column represented as a row in a physical table in real time by assigning the column sequence identifier of the selected custom logical column to the custom physical column;
retrieve a custom column definition for the custom physical column in real time to form an enriched dataset of custom column records from the custom column definition and the assigned column sequence identifier;
pivot the enriched dataset into the selected custom logical column in real time to integrate the custom logical column into the logical model; and
present the logical model including the mapped custom logical columns for access in a business intelligence environment.

17. The computing system of claim 16, wherein the non-transitory computer-readable medium further comprises instructions that when executed by at least the processor cause the computing system to:
pre-configure the logical model with placeholder logical columns for up to a fixed number of custom logical columns, wherein the selected custom logical column is selected from among the available placeholder logical columns not already mapped; and
associate a unique column sequence identifier with each of the placeholder logical columns in the logical model.

18. The computing system of claim 16, wherein the non-transitory computer-readable medium further comprises instructions that when executed by at least the processor cause the computing system to:
hide all unmapped custom logical columns when presenting the logical model for access; and
assign the mapped custom logical column a business name that represents the definition of the custom physical column.

19. The computing system of claim 16, wherein the non-transitory computer-readable medium further comprises instructions that when executed by at least the processor cause the computing system to:
accept an input through a graphical user interface indicating that the selected custom logical column is to be mapped to the custom physical column, wherein the mapping, retrieving, pivoting, and presenting steps are performed automatically in response to accepting the input.

20. The computing system of claim 16, wherein the non-transitory computer-readable medium further comprises instructions that when executed by at least the processor cause the computing system to:
accept an input through a graphical user interface indicating that the selected custom logical column is to be un-mapped from the custom physical column;
in response to accepting the input, automatically delete the mapping between the selected custom logical column and the custom physical column in real time; and
immediately present the logical model without the mapped custom logical columns for access in the business intelligence environment.

* * * * *